Feb. 18, 1969  G. M. CERTAIN  3,428,777
WELDING APPARATUS
Filed Jan. 13, 1966
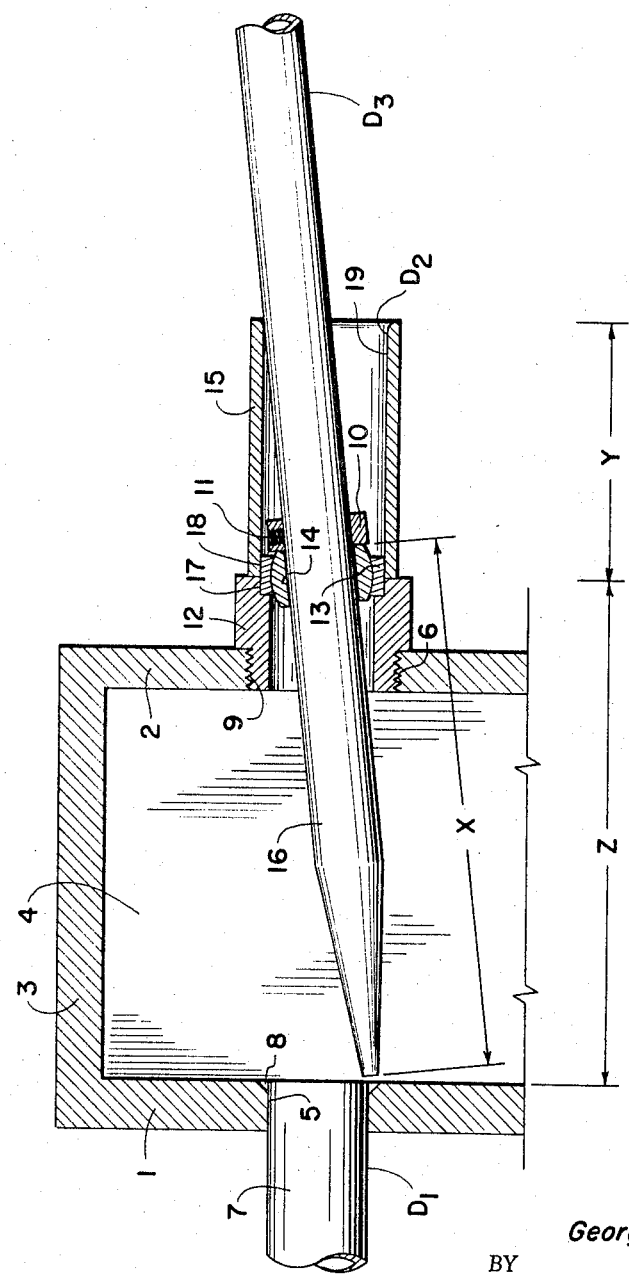
INVENTOR.
George M. Certain
BY
William S. Dorman
ATTORNEY

United States Patent Office 3,428,777
Patented Feb. 18, 1969

3,428,777
WELDING APPARATUS
George M. Certain, Tulsa, Okla., assignor to Cooling Products, Inc., Tulsa, Okla., a corporation of Oklahoma
Filed Jan. 13, 1966, Ser. No. 520,499
U.S. Cl. 219—125　　2 Claims
Int. Cl. B23k 9/12

ABSTRACT OF THE DISCLOSURE

A welding apparatus for providing a weld of a predetermined size and shape on the surface of one of two parallel members by means of an elongated welding gun which extends through a hole in the other member including a hollow plug received in the hole, a spherical bearing mounted in the plug and having an opening which permits the insertion of the welding gun through the bearing towards the first member; a stop means including a collar which is adjustably mounted on the welding gun and is engaged with the spherical bearing for locating the tip of the welding gun in proper relation to the welding area on the first member; the apparatus also includes a guide means defined by a hollow sleeve of predetermined length and diameter extending outwardly from the plug in coaxial relation therewith. During the welding operation, the welding gun is urged against and along the hollow sleeve whereby the tip of the welding gun will describe a circle or other path corresponding to the size and shape of the weld.

---

The present invention relates to certain auxiliary means or attachments to be used in conjunction with a welding operation. The present invention will hereinafter be described in terms of a welding operation on a heat exchanger but the invention should not be considered as limited thereto. Obviously this invention can be used in connection with any welding operation having the same or similar problems.

Finned-tube type heat exchangers, generally speaking, have certain baffled chambers or compartments at the opposite ends thereof which determine the direction of flow and the number of passes through the tubes. Naturally it is essential that the tubes of be sealed into the end chambers or compartments in fluid-tight relation. The compartment or chamber described above has a tube plate in which the tubes are secured. The outermost plate is referred to as the plug plate. It is customary for the plug plate to have a plurality of holes equal in number and opposite to the ends of the tubes. These holes in the plug plate are threaded and are of larger diameter than the tubes. The purpose of the holes in the plug plate is to provide access for the tool which is used to flare the outer ends of the tubes. As far as the prior art practice is concerned, the tubes are inserted one or two at a time into the holes in the tube plate, their ends are flared in the manner described above and the tubes are sealed to the tube plate by means of welding on the outer surface of the tube plate (exteriorly of the compartment).

There are numerous disadvantages to the above described method of welding. The foremost disadvantage is that the process is extremely time consuming. Another disadvantage is each successive weld must be located substantially adjacent to the preceding weld so as to result in undesired localized heating and possible warping and bending of the plates and tubes.

By means of the present invention all of the tubes can be inserted in the tube plate simultaneously and all of the ends thereof, if desired, can be flared prior to any welding operation. The present invention also permits the welding to be done on the interior surface of the tube plate. The present invention also permits successive welding operations at relatively spaced locations to avoid localized overheating.

The essential elements of the present invention are an adapter to guide a conventional welding gun and adjustable collar to position the gun relative to the adapter and the weld area. More particularly the adapter includes a hollow plug having an internal bore of sufficient size to accommodate a conventional welding gun. The plug is provided with a spherical bearing having an opening therein through which the welding gun is adapted to pass. The plug may be suitably threaded so as to fit in one of the holes in the plug plate. The collar is adjustably secured to the welding gun such that, with the adapter in position, the tip of the welding gun which reach substantially to the area of the desired weld. Finally the adapter is provided with an outwardly extending sleeve or predetermined length and predetermined internal diameter such that, as the outer end of the welding gun is urged against the sleeve and rotated therearound, the tip of the welding gun will describe a circle at the welding area corresponding to the size and shape of the desired weld.

Therefore it is the principal object of the present invention to provide a welding apparatus of the type described above which will permit quicker welding operations than those heretofore obtainable in the art.

It is another object of the present invention to provide welding apparatus of the type described above which will permit a welding operation which avoids localized overheating.

It is a further object of the present invention to provide a welding apparatus of the type described above which will permit the welding of the interior ends of tubes within a chamber or compartment.

Other and further objects and advantageous features of the present invention will hereinafter more fully appear in connection with the detailed description of the drawing which is an elevation, with certain parts in section, showing the apparatus of the present invention employed in conjunction with a welding operation on a finned-tube type of heat exchanger.

Referring to the drawing in detail the present invention is disclosed in particular relation to a welding operation involving the welding of the ends of tubes in a finned-tube type heat exchanger; however it must be emphasized that the invention is not necessarily limited to welding operations with this particular type of structure. Obviously the invention is adapted for similar or analogous uses. At any event, the drawing shows a tube plate 1, a plug plate 2 and an end plate 3 defining part of a compartment 4 such as one might find at the end of a conventional tube-type heat exchanger (not shown in detail). The tube-plate which is provided with a plurality of holes 5 (only one of which is shown) whereas the plug plate 2 is provided with a plurality of holes 6 (only one of which is shown). Equal in number, and opposite to the holes 5, a tube 7 having a diameter $D_1$ is shown with its end received in the hole 5. If desired, the inner end of the hole 5 may be chamferred or beveled as shown at 8 for the purpose of cooperating with the flaring of the inner ends of the tubes.

The drawing also shows an adapter including a hollow plug 12 having an internal bore of sufficient size to accommodate a conventional welding gun 16. The inner end of the plug 12 is provided with threads 9 which are engageable with the threads of the hole 6 when the plug 12 is screwed into this hole. The outer end of the plug 12 is provided with an enlarged annular recess 17. The spherical bearing 14 together with its bearing seat 13 is available as a standard purchased item. The diameter of the recess 17 is such as to receive the bearing seat 13 in a pressure-tight fit. A sleeve 15 having an opening 18 of substantially the same size as the recess 17 is inserted over the other end of the bearing seat 13 such that it is received thereon in pressure-tight relation. Elements 12, 13, 14 and 15, thus, constitute an essentially integral device which functions both as a support and as a guide means for the welding gun 16.

A collar 10 having a set screw 11 is received on the welding gun 16. The left hand end of the collar 10 will abut against the right hand end of the spherical bearing 14. Initially the position of the collar 10 is adjusted from the tip end of the gun 16, as represented by the distance X, such that the tip is adjacent the area of the circular weld which will correspond to the circular chamferred area 8. The sleve 15 is provided with an internal bore 19 having internal diameter $D_2$. The bore 19 can be larger or smaller than the opening 18 as desired. The diameter of the welding gun will be considered as $D_3$. The distance from the center of the bearing 14 to the outer end of the sleeve 15 will be referred to as Y, whereas the distance from the center of the bearing 14 to the plane of the weld area will be defined as Z.

If the relative spacing between the plates 1 and 2 and the diameter $D_1$ of the tube 7 remain the same as in the drawing then the length Y and the diameter $D_2$ of the sleeve 15 will remain constant as will the position of the collar 10 as determined by the distance X. However if the spacing between the plates 1 and 2 should be greater or less than that shown or if the diameter $D_1$ of the tube 7 should increase or decrease in relation to that shown then the length and diameter of the sleeve 15 might vary. For the purposes of the following discussion the diameter $D_1$ which is the diameter of the tube 7 will also be considered to be the diameter, or approximate diameter, of the weld in the chamferred circle 8. If the outer end of the welding gun 16 were urged against the outer end of the sleeve 15 and rotated therearound the cented of the welding gun at this point would describe a circle whose diameter would be approximately $D_2$ minus $D_3$; at the same time the left hand end or tip of the welding gun 16 would describe a circle whose diameter would be $D_1$.

It is stated above that the circle described by the center of the welding gun in the area of contact between the welding gun and the sleeve 15 is equal to $D_2$ minus $D_3$. Actually, such a statement is not wholly precise because the distance from the center of the welding gun to the point of contact (and in the plane of contact) is slightly greater than the radial dimension of the welding gun. Let angle A be the angle formed between the central axis of the welding gun and the line drawn from the center (pivot point) of spherical ball to the center of the circular weld 8. With these considerations in mind, the precise diameter of the circle described by the center of the welding gun in the plane of contact with the sleeve 15 will be equal to $D_2$ minus $D_3/\cos A$; stated differently the circle described by the center of the gun in the plane of contact will be $D_2-D_3$ sec $A$. On the other hand the angle A will generally be less than 10 degrees and perhaps in the neighborhood of 5 degrees. Since the secant (or cosine) of such a small angle would be nearly equal to one, it is a reasonable approximation to say that the circle described by the center of the gun in the plane of contact is equal to $D_2-D_3$.

The relationship between the variables can be described in accordance with the following formula:

$$\frac{D_1}{Z} = \frac{D_2 - D_3 \sec A}{Y}$$

As a simplification, particularly where the angle A is small the formula may be restated as follows:

$$\frac{D_1}{Z} = \frac{D_2 - D_3}{Y}$$

Whereas the present invention has been described in particular relation to the drawing attached hereto it should be understood that other and further modifications, apart from those shown or suggested herein, might be made within the spirit and scope of this invention. For example, the sleeve 15 could be made in sections wherein one section would be adjustable with respect to the other in much the same manner as the parts of a micrometer. The sleeve 15 need not necessarily be in the form of a cylindrical member but it could be a ring of a given internal diameter spaced at a given or known distance with respect to the plug plate 2. The location of the universal-type support 14 is not critical just so long as its location is relatively fixed with respect to the plug plate 2. The details of the welding gun 16 are considered conventional and, hence, are not shown; however, preferably, means would be provided for feeding a continuous flexible rod of welding material to the gun 16 and further means will be included to provide an outflow of inert gas at the tip of the gun. In operation the inner ends of the tubes 7 may be flared slightly or not as desired. Additional means can be provided, if desired, to insure continuous contact between the welding gun and the inner external edge of the sleeve 15.

What is claimed is:

1. Means for providing a weld of a predetermined size and shape on the surface of a first member by means of an elongated welding gun extending through a hole in a second member spaced from said first member which comprises a hollow plug received in said hole and having an internal bore of sufficient size to accommodate said welding gun, a spherical bearing seat mounted in said plug, a spherical bearing mounted in said bearing seat, said spherical bearing having an opening to permit the insertion of said welding gun therethrough such that the welding gun extends through the hole towards said first member, a collar adjustably mounted on said welding gun and engageable with said spherical bearing for locating the tip of said welding gun in the proximity of the weld area on said first member, and a hollow sleeve of predetermined length and diameter extending outwardly from said plug substantially coaxial with said internal bore and defining a predetermined path of movement of said welding gun when the latter is urged against and along said hollow sleeve, whereby the tip of said welding gun describes a movement corresponding to the predetermined size and shape of said weld at the weld area.

2. Welding means as set forth in claim 1 wherein the predetermined shape of the weld and the predetermined path of movement of the welding gun are both circular and correspond to the following formula:

$$\frac{D_1}{Z} = \frac{D_2 - D_3 \sec A}{Y}$$

where $D_1$ is the diameter of the weld,
$D_2$ is the outer internal diameter of the sleeve,
$D_3$ is the outer diameter of the welding gun,
Y is the distance from the center of the spherical bearing to the end of the sleeve,
Z is the distance from the center of the spherical bearing to the plane of the weld area,
A is the angle formed between a line from the center of the spherical bearing to the weld and a line from the center of the spherical bearing to the center of the weld area, and
Sec $A$ is the secant of the angle A.

References Cited

UNITED STATES PATENTS

| 1,508,713 | 9/1924 | Noble | 219—125 |
| 2,818,493 | 12/1957 | Pilia et al. | 219—125 |

FOREIGN PATENTS

| 972,889 | 10/1959 | Germany. |
| 1,142,977 | 1/1963 | Germany. |
| 6,405,378 | 11/1964 | Netherlands. |

RICHARD M. WOOD, *Primary Examiner.*

W. DEXTER BROOKS, *Assistant Examiner.*